United States Patent Office 3,386,936
Patented June 4, 1968

3,386,936
CARVEABLE COMPOSITIONS COMPRISING PARAFFIN WAX, ETHYLENE-VINYL ACETATE OR ETHYLENE-ETHYL ACRYLATE COPOLYMER AND PLASTICIZER
Travis L. Gordy, Francis J. Higgins, and Olen L. Riggs, Jr., Ponca City, Okla., assignors to Continental Oil Company, Ponca City, Okla., a corporation of Delaware
No Drawing. Continuation-in-part of application Ser. No. 273,829, Apr. 18, 1963. This application Jan. 27, 1964, Ser. No. 340,527
13 Claims. (Cl. 260—27)

ABSTRACT OF THE DISCLOSURE

Wax-containing composition which is easily carveable and particularly suitable for use as carving or sculpturing blocks. The composition comprises paraffin wax, wax-extendible copolymer (e.g., ethylene-vinyl acetate copolymer) and plasticizing agent (e.g., methyl stearate).

---

The present invention relates to wax-containing compositions. More particularly, the present invention relates to wax-containing compositions having properties which render them particularly useful as scupturing or carving materials. In a preferred aspect, the invention relates to sculpturing blocks having a composition which comprises paraffin wax, wax-extendible copolymer and a plasticizing agent.

The present application is a continuation-in-part of application Ser. No. 273,829, filed Apr. 18, 1963, and now abandoned.

Heretofore numerous materials have been used as carving blocks; by this we mean the materials are particularly suited for both children and adults to carve objects such as animals, toys, and the like. Examples of materials which have heretofore been used include soap, paraffin wax, chalk and the like. While in general these materials have been satisfactory, they have possessed certain deficiencies. An example of such a deficiency is brittleness. Materials such as soap and paraffin wax are brittle and have a tendency to flakiness. In addition, the materials have been deficient in that the plasticity or workability of the materials was difficult to control. For example, an adult may prefer a material which is relatively hard and resists the use of comparatively sharp tools for working therewith. By contrast, it is desirable that carving blocks for children be relatively plastic in order that they can be worked with dull or blunt tools.

It has been found that certain wax-containing compositions, and particularly those wax-containing compositions which contain certain preferred plasticizing agents, have properties which render them particularly useful as materials for carving or sculpturing.

It is an object of the present invention to provide wax-containing compositions which are suitable for use as sculpturing blocks.

It is another object of the invention to provide a composition comprising paraffin wax, wax-extendible copolymer and plasticizing agent which is particularly suitable for use as a sculpturing block. In an optional aspect, this object of the invention can include a crystal modifier for the paraffin wax.

It is yet another object of the invention to provide as an article of manufacture a sculpturing block comprising paraffin wax and wax-extendible copolymer.

It is still another object of the invention to provide as an article of manufacture of sculpturing block comprising paraffin wax, wax-extendible copolymer, and plasticizing agent. In an optional aspect of this object of the invention, the sculpturing block can include a crystal modifier for the paraffin wax.

It is an additional object of the invention to provide processes for preparing the above-mentioned sculpturing blocks.

Broadly stated, the present invention relates to a wax-containing composition which is suitable as a sculpturing material. In one aspect of this embodiment, the composition comprises paraffins wax, wax-extendible copolymer and a crystal modifier. In a preferred aspect of this embodiment of the invention, the composition comprises paraffin wax, wax-extendible copolymer and plasticizing agent. The preferred aspect can include, if desired, a crystal modifier.

In another embodiment the invention relates to sculpturing blocks as articles of manufacture, said sculpturing blocks comprising paraffin wax and wax-extendible copolymer. In one aspect of this embodiment the sculpturing block comprises paraffin wax, wax-extendible copolymer and a crystal modifier. In a preferred aspect of this embodiment the sculpturing block comprises paraffin wax, wax-extendible copolymer and plasticizing agent. The preferred aspect can include, if desired, a crystal modifier.

In still another embodiment the invention relates to processes for preparing the above-mentioned sculpturing blocks.

Prior to presenting examples which illustrate the preferred aspects of our invention, it may be best at this point to discuss the compositions which can be used in our sculpturing blocks and the materials which are used in the compositions. The terms "sculpturing blocks" and "carving blocks" are used synonymously herein. They refer to solid pieces of any shape, but more usually of a regular shape, such as square, rectangular, spherical, and the like. Also, they refer to any size, from very small to very large, insofar as they can be carved or sculptured. The solid pieces of materials are used to create animals, toys, and art objects. It is will known that in beginning art classes "carving blocks" of soap and the like have been used. Our invention provides such "carving blocks" of varying degrees of hardness, workability and plasticity. For example, our invention can provide a relatively hard carving block for use by adults. Such a material requires a sharp instrument for carving. It is a particular advantage of our invention that we can provide a carving block particularly suitable for children. The material is easily carved with a blunt instrument yet it is not brittle and is relatively resistant to impact (in other words, it does not "dent" or deform easily).

The carving blocks of our invention can have the following composition:

|  | Parts by Weight | |
|---|---|---|
|  | Suitable | Preferred |
| Paraffin wax | 2-19 | 4-15 |
| Wax-extendible copolymer | 1-10 | 5-10 |

In addition, if desired, a crystal modifier can be added to this composition. This crystal modifier is used in an amount in the range of 0.03 to 1.5 parts per part of paraffin wax. Carving blocks such as the preceding are relatively hard and probably would be restricted to use by adults or older children.

The preferred embodiments of our invention, both composition of matter and article of manufacture, have the following composition:

|  | Parts by Weight | | |
| --- | --- | --- | --- |
|  | Suitable | More Suitable | Preferred |
| Paraffin wax | 9–18 | 9–17 | 9–16 |
| Wax-extendible copolymer | 1–9 | 2–6 | 4–7 |
| Plasticizing agent | 1–9 | 1–7 | 1–6 |

In addition, if desired, a crystal modifier can be added to these embodiments of our invention. This crystal modifier is used in an amount in the range of 0.03 to 1.5 parts per part of paraffin wax. Carving blocks of the preceding composition range can be prepared in a wide range of hardness and plasticity. The carving blocks having the lower amount of plasticizing agent have properties approaching those of the carving blocks listed above.

The term "paraffin wax" is used to define the hard, crystalline wax commonly obtained from petroleum distillates, derived from mineral oils of the mixed-base or paraffin-base type. By the present refining methods, crude petroleum oil is subjected to distillation whereby it is separated into a series of fractions known as "paraffin distillates." The wax is separated from the paraffin distillate by chilling and filtering or by the use of a solvent, as for example, propane or a ketone such as methyl ethyl ketone. The wax obtained by either of these two methods contains from 10 to 50 percent oil and is generally referred to as "slack wax." This slack wax is subjected to a "sweating operation" to remove the oil. By proper sweating the oil content may be reduced to less than 1 percent. Also, the oil content may be reduced to an acceptable value by other methods such as solvent deoiling or press deoiling. The final product is known as "refined wax" or "paraffin wax" and is graded according to the tensile strength, melting point, oil content, hardness, etc.

While any of the waxes conforming to the preceding definition can be used in our invention, the more suitable waxes have a melting point in the range of 115–160° F., while the preferred waxes have a melting point in the range of 120–135° F. Also, the oil content of the more suitable paraffin waxes is about 2.5 percent by weight or less with the preferred waxes having an oil content of about 1.0 percent by weight or less.

Suitable wax-extendible copolymers for use in our invention includes the following: ethylene-vinyl acetate copolymers, ethylene-ethyl acrylate copolymers, and mixtures thereof. Of these, the ethylene-vinyl acetate copolymers are preferred.

The ethylene-vinyl acetate copolymers and the ethylene-ethyl acrylate copolymers are prepared by free radical polymerization of the co-monomers at elevated temperatures and pressures. The copolymers are usually identified by a combination of the ratios of the co-monomers present in the product and by the melt indexes. Suitable ethylene-vinyl acetate copolymers for use in the present invention are those containing from about 60 to about 82 percent (weight) ethylene and from about 18 to about 40 percent (weight) vinyl acetate and having melt indexes in the range of about 3 to about 400. Particularly suitable ethylene-vinyl acetate copolymers are those containing from about 65 to about 82 percent (weight) ethylene and from about 18 to about 35 percent (weight) vinyl acetate and having melt indexes in the range of about 10 to about 400. Preferred ethylene-vinyl acetate copolymers are those containing from about 70 to about 75 percent (weight) ethylene and from about 25 to about 30 percent (weight) vinyl acetate and having melt indexes in the range of about 10 to about 200. Suitable ethylene-ethyl acrylate copolymers are those containing from about 65 to about 85 percent (weight) ethylene and from about 15 to about 35 percent (weight) ethyl acrylate and having melt indexes in the range of about 3 to about 30.

Ethylene-ethyl acrylate copolymers are available in commercial quantities under the "ZETAFIN" trademark. They are also available under a "DQDA" series identification.

Ethylene-vinyl acetate copolymers are available in commercial quantities under the "ELVAX" trademark. Properties of various "ELVAX" copolymers are as follows:

| Property | Elvax 260 | Elvax 250 | Elvax 240 | Elvax 220 | Elvax 150 |
| --- | --- | --- | --- | --- | --- |
| Co-monomer ratios: | | | | | |
| Percent ethylene | 73–71 | 73–71 | 73–71 | 73–71 | 68–66 |
| Percent vinyl acetate | 27–29 | 27–29 | 27–29 | 27–29 | 32–34 |
| Melt Index [1] | 3 | 12–18 | 22–28 | 125–175 | 22–28 |
| Density at 30° C. | .95 | .95 | .95 | .95 | .95 |
| Refractive Index, 25° C., D line | 1.485 | 1.485 | 1.485 | 1.485 | 1.482 |
| Softening point, ring and ball, ° F. | 363 | 276 | 233 | 192 | 243 |

[1] The melt index is determined by ASTM Method No. D1238–57T.

Ethylene-vinyl acetate copolymers are also available under the "Co-MER VA" trademark. Properties of various "Co-MER VA" resins are as follows:

| Property | Co-MER VA DQD-7268 | Co-MER VA DQD-6225 | Co-MER VA DQD-3269 |
| --- | --- | --- | --- |
| Co-monomer ratio: | | | |
| Percent ethylene | 72 | 82 | 72 |
| Percent vinyl acetate | 28 | 18 | 28 |
| Melt Index, gms./10 min. | 350 | 145 | 17–23 |
| Density, gm./cc. | 0.943 | 0.935 | 0.950 |
| Refractive Index, 25° C., D line | 1.483 | 1.497 | 1.483 |
| Softening point, ring and ball, ° F. | 182 | 206 | 228 |

As indicated previously, the combination of paraffin wax and wax-extendible copolymer (preferably, ethylene-vinyl acetate copolymer) gives a composition which is suitable for use as a sculpturing block. The addition of ethylene-vinyl acetate copolymer to the paraffin wax produces a noticeable improvement in the flexibility of the block. At any given ratio of copolymer to wax, the flexibility improvement is directly related to the increasing molecular weight of the copolymer. As the ratio of copolymer to wax increases, flexibility improves, and strength or toughness increases. However, the effort required to carve also increases. Because of this, a paraffin wax-copolymer composition containing sufficient copolymer to produce the desired flexibility may require more effort to carve than may be desirable to some users. We have discovered that certain plasticizing agents can be included in the composition which do not detract from the flexibility of the carving block, yet they improve the ease of carving the product. It is of interest that some plasticizers improve both flexibility and carving ease.

Suitable plasticizing agents for use in our invention include the following:

Chlorinated paraffins*
Chlorinated biphenyls
Petrolatum
Microcrystalline wax-petrolatum combinations
Glycerol monolaurate*
Acetylated monoglycerides*
Hydrogenated methyl ester of rosins*
Esters of alkanoic acids*
Copolymers of α-methyl styrene and vinyl toluene*

Of the preceding suitable plasticizing agents, the members indicated with an asterisk (*) are more suitable for use in the present invention. It is of interest that the hydrogenated methyl ester of rosins imparts a pine-like odor to the carving block. The esters of alkanoic acids are the preferred plasticizing agents of this invention. The esters can contain a total of 8 to 50 carbon atoms, preferably 13 to 26 carbon atoms, and more preferably 13 to 22 carbon atoms. They can include either alkyl or aryl groups. The alkyl groups can be derived either from the acid or the alcohol forming the ester, can be either long or short chain, and can be either straight or branched chain. Similarly, the aryl group can be derived either from the acid or the alcohol forming the ester. In addition, the ester can be derived from both monobasic and dibasic acids.

A particularly preferred group of esters are the alkyl esters of alkanoic acids having the following structural formula:

$$CH_3(CH_2)_y\overset{O}{\overset{\|}{C}}OR$$

wherein R is an alkyl group having not more than 8 carbon atoms and y is an integer equal to at least 4. Preferably, R has 1–4 carbon atoms and y is an integer equal to 10–20. More preferably, y is an integer equal to 10–16. Both the alkyl group and the acyl group of the ester may be either straight or branched chain.

Examples of esters which are preferred plasticizing agents include hexyl heptanoate, hexyl caprylate, octyl capyrlate, ethyl pelargonate, ethyl decanoate, octyl decanoate, ethyl n-undecylate, n-butyl laurate, octyl laurate, methyl myristate, n-butyl myristate, octyl myristate, methyl palmitate, n-butyl palmitate, octyl palmitate, methyl stearate, n-butyl stearate, octyl stearate, ethyl nonadecanoic, methyl docosanate, ethyl hexacosanate, methyl triacontanate, hexadecyl acetate, hexadecyl propionate, hexadecyl butyrate, octadecyl acetate, octadecyl propionate, eicosyl acetate, docosyl acetate, tetracosyl acetate, acetate ester of mixtures of $C_{20}$–$C_{22}$ straight chain alcohols, dihexyl glutarate, di-decyl sebacate, di-octyl azzelate, di-isooctyl isophthalate, di-n-hexyl terephthalate, phthalate ester of mixed $C_{16}$–$C_{18}$ straight-chain alcohols.

The manufacture and properties of α-methyl styrene-vinyl toluene copolymers are described in U.S. Patent No. 3,000,868. These copolymers are available under the trademark "Piccotex." They are available in various grades, based upon their softening point. For example, "Piccotex" 100 refers to a copolymer having a softening point of 100° C.

As used herein, the term "plasticizing agent" is intended to include any material which exerts a plasticizing effect in the compositions and articles of this invention. This term is intended to include materials which, in addition to plasticizing, also have other effects. For example, some of the crystal modifying agents which are discussed subsequently also exert a plasticizing effect and thus can be considered to come within the scope of the definition. The term "plasticizing effect," as used herein, means a softening and/or flexibilizing effect.

In the event it is desired to produce a carving block which has a minimum waxy, or soapy feel, a paraffin crystal modifier can be incorporated into the block. Examples of suitable crystal modifiers are:

Microcrystalline wax
Wax compatible polyethylenes (having molecular weight in the range of 1,500–12,000)
Rosin and rosin derived resins
Terpene resins The crystal modifiers are used in amounts in the range of 0.03 to 1.5 parts per part of paraffin wax. The amount used depends partly on the molecular weight of the crystal modifier. For example, in the list of suitable crystal modifiers given above, microcrystalline wax has a relatively low molecular weight and might be used in quantities approaching the upper part of the range. By contrast, a relatively high molecular weight polyethylene might be used in quantities in the lower part of the range.

The term "microcrystalline wax" refers to a wax material which is obtained usually from the residual product of the vacuum distillation of lubricating oils. In general, microcrystalline waxes contain only very minor quantities of straight chain paraffinic hydrocarbons. For additional information concerning the properties and preparation of microcrystalline waxes, we refer to U.S. Patent No. 2,983,664, by Concetto T. Camilli.

In addition, it may be desirable to include in the carving block pigments, such as titanium dioxide, iron oxide, etc., dyes, perfumes, or fillers, which can be either organic or inorganic. It is to be understood that the use of these materials is optional and does not form part of our invention.

One method of preparing the sculpturing blocks of our invention comprises the following:

(a) blend desired components (e.g., paraffin wax, copolymer, and plasticizing agent) in molten state,
(b) incorporate any desired pigment, dye, etc., in the admixture,
(c) pour into mold,
(d) remove from mold.

In the preceding method it is desirable to use a release agent. The release agent (for example, a silicone) can be used to coat the mold surfaces. If desired, a release agent can be incorporated in the formulation. In this procedure, glycerol monolaurate is useful as a release agent.

Another method of preparing the sculpturing blocks of our invention is by injection molding.

Still another method is to form slabs in conventional wax slabbing pans. The slabs are then cut to desired size with knives, or wires.

Yet another method is to extrude in a long bar shape and then cut into desired lengths.

An additional method is to prepare the carving block composition in pellet form, melt the pellets and mold or cast into the desired shape and size. In this method the steps of melting and molding are conducted by the user or person who carves the block.

In summary, our invention comprises at least a two-component carving block (e.g., paraffin wax and copolymer). An optional embodiment of our invention comprises the use of three components (e.g., paraffin wax, copolymer, and crystal modifier). A preferred embodiment of our invention comprises three components, viz. paraffin wax, copolymer, and plasticizing agent. Another embodiment of our invention comprises four components, paraffin wax, copolymer, plasticizing agent, and crystal modifier.

In order to disclose the nature of the present invention still more clearly, the following illustrative examples will be given. It is to be understood, however, that the invention is not to be limited to the specific conditions or details set forth in these examples except insofar as such limitations are specified in the appended claims.

Example 1

Carving blocks were prepared having the following compositions in parts by weight:

|  | Blend Number | | |
| --- | --- | --- | --- |
|  | A | B | C |
| Paraffin wax, 125–127° F., melting point | 73 | 3 | 6 |
| Ethylene-vinyl acetate copolymer-I [1] | 25 |  |  |
| Ethylene-vinyl acetate copolymer-II [2] |  | 1 | 3 |
| Polyethylene [3] | 2 |  |  |
| Methyl stearate |  |  | 1 |

[1] Elvax 250.
[2] Elvax 220.
[3] Molecular weight 4,000; density 0.89 DYDT.

Blocks prepared from blends A and B had good carving characteristics, but were considered tougher than blocks from blend C. In addition, they required more force for carving than might be desirable for some users. Blocks prepared from blend C were easy to carve and possessed very good plastic properties.

Example 2

Carving blocks were prepared from the following compositions:

Blend D: Parts by weight
    Paraffin wax having an ASTM melting point of 125–130° F. and an oil content of less than 0.5 percent_____ 7.5
    Hydrogenated methyl ester of rosin [2]_____ 1.0
    Ethylene-vinyl acetate copolymer [1]_____ 1.5

Blend E:
    Paraffin wax having an ASTM melting point of 125–130° F. and an oil content of less than 0.5 percent_____ 7.8
    Hydrogenated methyl ester of rosin [2]_____ 1.0
    Ethylene-vinyl acetate copolymer [1]_____ 2.3

Blend F:
    Paraffin wax having an ASTM melting point of 125–130° F. and an oil content of less than 0.5 percent _____ 6.7
    Ethylene-vinyl acetate copolymer [1]_____ 2.0

Blend G:
    Paraffin wax having an ASTM melting point of 125–130° F. and an oil content of less than 0.5 percent _____ 9.0
    Methyl stearate [3]_____ 4.0
    Ethylene-vinyl acetate copolymer [1]_____ 6.0
    α-Methyl styrene-vinyl toluene copolymer [4]_____ 1.0

[1] "Elvax" 220.
[2] The hydrogenated methyl ester of rosin was "Hercolyn" D.
[3] The methyl stearate was "Metholene" 2218, 95% purity.
[4] The α-methyl styrene-vinyl toluene copolymer was "Piccotex." Grade 120 was used.

Example 3

Using ethylene-ethyl acrylate copolymer, carving blocks were prepared having the following composition:

Blend A: Parts by weight
    Paraffin wax [1]_____ 7
    Copolymer [2] _____ 3

Blend B:
    Paraffin wax [1]_____ 7
    Copolymer [2] _____ 3
    Methyl stearate_____ 1

Blend C:
    Paraffin wax [1]_____ 7
    Copolymer [2] _____ 3
    Methyl stearate _____ 2

[1] The paraffin wax had an ASTM melting point of 125–130° F. and an oil content of less than 0.5 percent.
[2] The ethylene-ethyl acrylate copolymer was "Zetafin" 70. This material had a melt index of 18.5 and a density of 0.929.

All of the blocks prepared from the above blends were carveable. The block from blend A required more effort to carve than the block from blend B, while in turn the block from blend B required more effort to carve than the block from blend C. The block from blend A was more difficult to break than a straight paraffin wax but was somewhat deficient in flexibility properties. The block from blend B was somewhat more flexible than the block from blend A. The block from blend C had the best carveability and flexibility of the three blends. It did not have, however, properties as good as blocks prepared from similar blends using ethylene-vinyl acetate copolymer.

Example 4

In this example, penetration data were obtained on blocks prepared from various blends. The blend compositions and the data obtained were as follows:

| Composition | | Parts (Weight) | Needle Penetration,[1] mm.⁻¹ | |
|---|---|---|---|---|
| | | | 77° F. | 90° F. |
| Blend: | | | | |
| A | Copolymer [2] | 3 | 2 | 12 |
| | Paraffin wax [3] | 7 | | |
| B | Copolymer [2] | 3 | 3 | 13 |
| | Paraffin wax [3] | 6.5 | | |
| | Methyl stearate | 0.5 | | |
| C | Copolymer [2] | 3 | 3 | 21 |
| | Paraffin wax [3] | 6 | | |
| | Methyl stearate | 1 | | |
| D | Copolymer [2] | 3 | 8 | 24 |
| | Paraffin wax [3] | 5.5 | | |
| | Methyl stearate | 1.5 | | |
| E | Copolymer [2] | 3 | 16 | 35 |
| | Paraffin wax [3] | 4 | | |
| | Methyl stearate | 3 | | |

[1] ASTM Method D1321-57T (100 g.).
[2] "Elvax" 220 = An ethylene-vinyl acetate copolymer.
[3] ASTM melting point of 125–130° F. and an oil content of less than 0.5 percent.

Example 5

In this example, additional carving blocks were prepared and evaluated. The compositions of the blends were as follows:

| | Components | Parts by Weight |
|---|---|---|
| Blend: | | |
| A | Ethylene-vinyl acetate copolymer [1] | 5 |
| | Paraffin wax [2] | 5 |
| B | Ethylene-vinyl acetate copolymer [1] | 5 |
| | Paraffin wax [2] | 5 |
| | Di-hexyl glutarate | 1 |
| C | Ethylene-vinyl acetate copolymer [1] | 5 |
| | Paraffin wax [2] | 5 |
| | Di-decyl glutarate | 1 |
| D | Ethylene-vinyl acetate copolymer [1] | 5 |
| | Paraffin wax [2] | 5 |
| | Di-C₈-C₁₀-n-alkyl isophthalate | 1 |
| E | Ethylene-vinyl acetate copolymer [1] | 5 |
| | Paraffin wax [2] | 5 |
| | Di-decyl sebacate | 1 |
| F | Ethylene-vinyl acetate copolymer [3] | 1 |
| | Intermediate wax [4] | 2 |
| | Paraffin wax [2] | 5 |
| G | Blend "F" | 100 |
| | Di-decyl sebacate | 3 |
| H | Blend "F" | 100 |
| | Propyl stearate | 5 |
| I | Blend "F" | 100 |
| | C₂₀-C₂₂-n-alkyl acetate | 20 |
| J | Blend "F" | 100 |
| | C₂₀-C₂₂-n-alkyl acetate | 15 |
| K | Blend "A" | 100 |
| | Methyl stearate | 10 |

[1] "Elvax" 220.
[2] This wax had an ASTM melting point of 128–132° F. and an oil content of less than 1.5 percent.
[3] "Elvax" 250.
[4] This wax had an ASTM melting point of 145–150° F. and an oil content of less than 0.5 percent.

The above-described carving blocks had the following properties:

Blend: Properties
    A      Cut—very hard.
            Flexibility—flexible.
    B      Cut—softer than base blend.
            Flexibility—slightly brittle.
    C      Cut—softer than base blend.
            Flexibility—slightly brittle.
    D      Cut—softer than base blend.
            Flexibility—flexible.
    E      Cut—softer than base blend.
            Flexibility—flexible.
    F      Cut—fair, slightly hard.
            Flexibility—brittle.
    G      Cut—slightly softer than Blend "F."
            Flexibility—flexible.
    H      Cut—softer than Blend "F."
            Flexibility—flexible.
    I      Cut—slightly easier than the base.
            Flexibility—slightly flexible.

Blend: Properties
J _____ Cut—slightly harder than the base.
   Flexibility—slightly more flexible than base blend.
K _____ Cut—softer than base blend.
   Flexibility—flexible.

Example 6

Carving blocks were prepared containing paraffin wax, ethylene-vinyl acetate copolymer, and a number of plasticizing agents. The plasticizing agents evaluated were the following:

Di-$C_8$–$C_{10}$-n-alkyl glutarate
Di-hexyl glutarate
Di-(2-ethyl)-hexyl glutarate
Di-octyl glutarate
Di-decyl glutarate
Di-decyl sebacate
Di-hexyl sebacate
Di-(2-ethyl)-hexyl sebacate
Di-decyl isosebacate
Di-hexyl isosebacate
Di-octyl isosebacate
Di-octyl azelate
Di-$C_6$–$C_{10}$-n-alkyl isophthalate
Di-isooctyl isophthalate
Di-isooctyl terephthalate
Di-(2-ethyl)-hexyl isophthalate
Di-n-hexyl terephthalate
Di-n-octyl terephthalate
Di-isooctyl terephthalate
Di-isooctyl isophthalate
Di-n-hexyl isophthalate
Di-n-decyl terephthalate
Di-n-isophthalate These materials were effective as plasticizing agents to some degree.

Example 7

Carving blocks were prepared having the following compositions:

| | Components | Parts by Weight |
|---|---|---|
| A | Paraffin wax [1] | 9.0 |
| | Methyl stearate [2] | 4.0 |
| | Ethylene-vinyl acetate copolymer [3] | 6.0 |
| | α-Methyl styrene-vinyl toluene copolymer [4] | 1.0 |
| B | Paraffin wax "1" [5] | 9.0 |
| | Paraffin wax "2" [6] | 5.0 |
| | Methyl stearate [2] | 2.5 |
| | α-Methyl styrene-vinyl toluene copolymer [4] | 1.0 |
| | Ethylene-vinyl acetate copolymer [3] | 2.5 |
| C | Paraffin wax "1" [5] | 9.0 |
| | Paraffin wax "2" [6] | 5.0 |
| | α-Methyl styrene-vinyl toluene copolymer [4] | 1.0 |
| | Ethylene-vinyl acetate copolymer [3] | 2.5 |
| | Acetate ester of mixed $C_{20}$–$C_{22}$ straight-chain alcohols. | 2.5 |
| D | Paraffin wax "1" [5] | 9.0 |
| | Paraffin wax "2" [6] | 5.0 |
| | Ethylene-vinyl acetate copolymer [3] | 2.5 |
| | Methyl stearate [2] | 3.5 |
| E | Paraffin wax "1" [5] | 62.5 |
| | Paraffin wax "2" [6] | 25.0 |
| | Ethylene-vinyl acetate copolymer [3] | 12.5 |
| | Phthalate ester of mixed $C_{16}$–$C_{18}$ straight-chain alcohols. | 15.0 |

[1] Melting point 125–130° F. and an oil content of less than 0.5 percent.
[2] "Metholene" 2218.
[3] "Elvax" 250.
[4] "Piccotex" 120.
[5] ASTM melting point of 128–132° F. and an oil content of less than 1.5 percent.
[6] ASTM melting point of 145–150° F. and an oil content of less than 0.5 percent.

In blends "A," "B" and "C" a combination of plasticizing agents were used to obtain carving blocks having a desired balance of cutting ease, strength and flexibility. Blends "B" and "C" used a higher melting paraffin wax to improve rigidity at higher ambient temperatures (e.g., 105° F.).

Blend "D" shows that a block having satisfactory properties can be obtained using a lower amount of copolymer.

Blend "E" shows that this particular plasticizing agent was effective. The blend containing this ester was easier to cut than a similar blend, excluding the ester.

Example 8

Carving blocks were prepared having the following compositions:

| | Components | Parts by Weight |
|---|---|---|
| A | Paraffin wax "1" [1] | 11 |
| | Ethylene-vinyl acetate copolymer [2] | 6 |
| | α-Methyl styrene-vinyl toluene copolymer [3] | 2 |
| | Chlorinated paraffin [4] | 1 |
| B | Paraffin wax "1" [1] | 6 |
| | Paraffin wax "2" [5] | 6 |
| | Ethylene-vinyl acetate copolymer [2] | 6 |
| | Chlorinated paraffin [4] | 2 |

[1] ASTM melting point of 125–127° F. and an oil content of less than 0.5 percent.
[2] "Elvax" 220.
[3] "Piccotex" 120.
[4] "Chlorowax LV"—a low viscosity, light yellow liquid containing 39–41 percent by weight of chlorine.
[5] ASTM melting point of 138–140° F. and an oil content of less than 0.5 percent.

Blocks prepared from the above-described compositions had good cutting and flexibility properties.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. A composition of matter, particularly suitable for use as sculpturing blocks, consisting essentially of in parts by weight: about 9 to about 18 parts paraffin wax, about 1 to about 9 parts wax-extendible copolymer, selected from the group consisting of ethylene-vinyl acetate copolymers containing from about 60 to about 82 percent (weight) ethylene and from about 18 to about 40 percent (weight) vinyl acetate and having melt indexes in the range of from about 3 to about 400, and ethylene-ethyl acrylate copolymers containing from about 65 to about 85 percent (weight) ethylene and from about 15 to about 35 percent (weight) ethyl acrylate and having melt indexes in the range of from about 3 to about 30; and about 1 to about 9 parts plasticizing agent selected from the group consisting of chlorinated paraffins, chlorinated biphenyls, petrolatum, microcrystalline wax-petrolatum combinations, hydrogenated methyl ester of rosins, and esters of monohydric aliphatic alcohols and alkanoic acids, said esters containing a total of 8 to 50 carbon atoms.

2. A composition of matter, particularly suitable for use as sculpturing blocks, consisting essentially of in parts by weight: about 9 to about 18 parts paraffin wax, about 1 to about 9 parts wax-extendible copolymer, selected from the group consisting of ethylene-vinyl acetate copolymers containing from about 60 to about 82 percent (weight) ethylene and from about 18 to about 40 percent (weight) vinyl acetate and having melt indexes in the range of from about 3 to about 400; and ethylene-ethylacrylate copolymers containing from about 65 to about 85 percent (weight) ethylene and from about 15 to about 35 percent (weight) ethyl acrylate and having melt indexes in the range of from about 3 to about 30; and about 1 to about 9 parts plasticizing agent which is an ester of a monohydric aliphatic alcohol and an alkanoic acid, said ester containing a total of 8 to 50 carbon atoms.

3. A composition of matter as defined in claim 2 characterized further in that it consists essentially of in parts by weight: about 9 to about 16 parts paraffin wax, about 4 to about 7 parts wax-extendible copolymer, and about 1 to about 6 parts plasticizing agent.

4. A composition of matter as defined in claim 3, characterized further in that the plasticizing agent is an ester of an alkanoic acid having the formula:

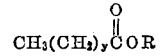

wherein R is an alkyl group having not more than 8 carbon atoms and y is an integer equal to at least 4.

5. A composition of matter as defined in claim 4, characterized further in that the alkyl ester has the formula:

$$CH_3(CH_2)_y\overset{O}{\overset{\|}{C}}OR$$

wherein R is an alkyl group containing from 1 to 4 carbon atoms and y is an integer equal to 10 to 20.

6. A composition of matter as defined in claim 5, characterized further in that y is an integer equal to 10 to 16.

7. A composition of matter as defined in claim 5, characterized further in that the copolymer contains from about 70 to about 75 percent (weight) ethylene and from about 25 to about 30 percent (weight) vinyl acetate and has a melt index in the range of about 10 to about 200.

8. A composition of matter as defined in claim 6, characterized further in that the plasticizing agent is methyl stearate.

9. A composition of matter as defined in claim 6, characterized further in that the composition contains a crystal modifier in the amount of about 0.03 to about 1.5 parts per part paraffin wax, said crystal modifier being selected from the group consisting of microcrystalline wax, wax compatible polyethylenes having molecular weight in the range of 1,500 to 12,000, rosin and rosin-derived resins, and terpene resins.

10. As an article of manufacture a sculpturing block consisting essentially of in parts by weight: about 9 to about 16 parts paraffin wax; about 4 to about 7 parts wax-extendible copolymer selected from the group consisting of an ethylene-vinyl acetate copolymer containing from about 70 to about 75 percent (weight) ethylene and from about 25 to about 30 percent (weight) vinyl acetate and having melt indexes in the range of from about 10 to about 200; and an ethylene-ethyl acrylate copolymer containing from about 65 to about 85 percent (weight) ethylene and from about 15 to about 35 percent (weight) ethyl acrylate and having melt indexes in the range of from about 3 to about 30; and about 1 to about 6 parts plasticizing agent selected from the group consisting of chlorinated paraffins, chlorinated biphenyls, petrolatum, microcrystalline wax-petrolatum combinations, hydrogenated methyl ester of rosins, and esters of monohydric aliphatic alcohols and alkanoic acids, said esters containing a total of 8 to 50 carbon atoms.

11. As an article of manufacture a sculpturing block consisting essentially of in parts by weight: about 9 parts paraffin wax having an ASTM melting point of 125–130° F.; about 4 parts methyl stearate; about 6 parts ethylene-vinyl acetate copolymer containing from 27 to 29 percent (weight) vinyl acetate and having a melt index in the range of 125–175; and about 1 part copolymer of α-methyl styrene and vinyl toluene.

12. As an article of manufacture a sculpturing block consisting essentially of in parts by weight: about 9 parts paraffin wax having an ASTM melting point of 125–130° F.; about 4 parts methyl stearate; about 6 parts ethylene-vinyl acetate copolymer containing from 27 to 29 percent (weight) vinyl acetate and having a melt index in the range of 12–18; and about 1 part copolymer of α-methyl styrene and vinyl toluene.

13. As an article of manufacture a sculpturing block consisting essentially of in parts by weight: about 9 parts paraffin wax having a melting point of 128–132° F.; about 5 parts paraffin wax having a melting point of 145–150° F.; about 2.5 parts methyl stearate; about 2.5 parts ethylene-vinyl acetate copolymer containing from 27 to 29 percent (weight) vinyl acetate and having a melt index of 12–18; and about 1 part copolymer of α-methyl styrene and vinyl toluene.

References Cited

UNITED STATES PATENTS

| | | | |
|---|---|---|---|
| 3,232,895 | 2/1966 | Klein et al. | 260—27 |
| 3,306,882 | 2/1967 | Pullen et al. | 260—28.5 |
| 3,308,086 | 3/1967 | Wartman | 260—30.6 |
| 2,485,592 | 10/1949 | Griess et al. | 260—23 |
| 2,586,357 | 2/1952 | Llewellyn | 260—28.5 |
| 2,857,341 | 10/1958 | Colwell et al. | 260—23 |
| 3,140,268 | 7/1964 | Halpern et al. | 260—23 |
| 3,148,059 | 9/1964 | Brunson et al. | 260—27 |
| 3,155,631 | 11/1964 | Zapp | 260—28.5 |
| 3,175,986 | 3/1965 | Apikos et al. | 260—27 |
| 3,205,186 | 9/1965 | Zaayenga | 260—28.5 |
| 3,207,716 | 9/1965 | Lippoldt | 260—23 |
| 3,245,931 | 4/1966 | Matthew | 260—28.5 |
| 3,256,228 | 6/1966 | Tyran | 260—28.5 |
| 3,325,431 | 6/1967 | McManus | 260—28.5 |
| 3,330,793 | 7/1967 | Podlipnik et al. | 260—28.5 |
| 3,338,856 | 8/1967 | Arabian et al. | 260—28.5 |

OTHER REFERENCES

Hercules Products (1948), p. 4.
Hercules Synthetic Resins (1949), pp. 3 and 4.

DONALD E. CZAJA, *Primary Examiner.*

L. J. BERCOVITZ, *Examiner.*

R. A. WHITE, *Assistant Examiner.*